United States Patent Office 3,421,433
Patented Jan. 14, 1969

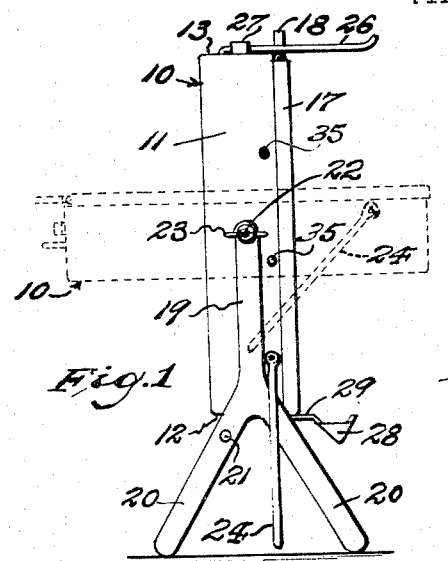
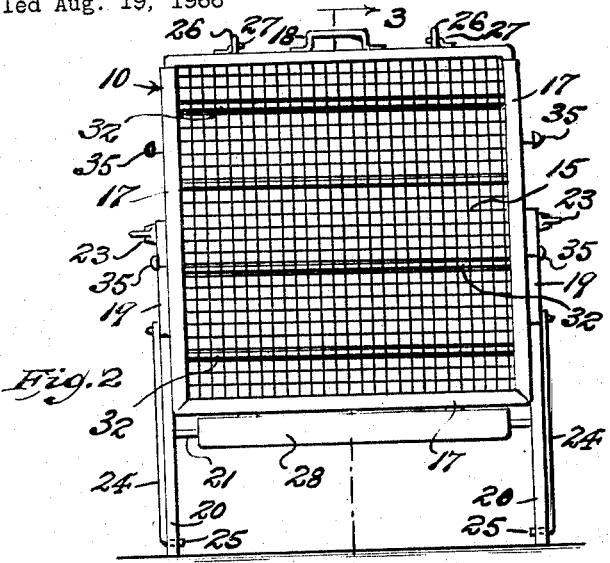
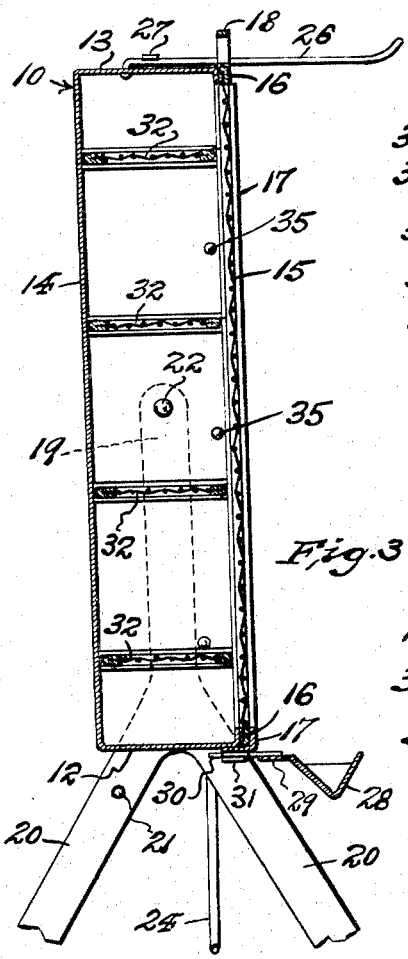
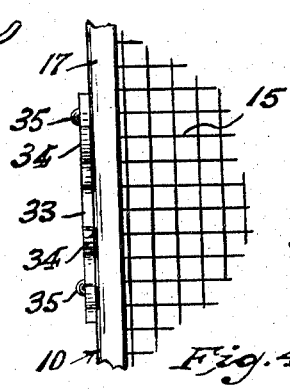
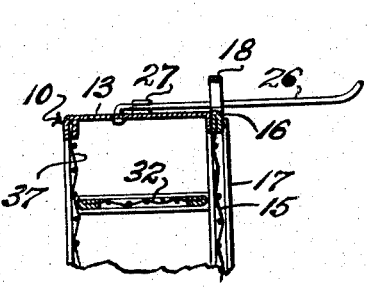
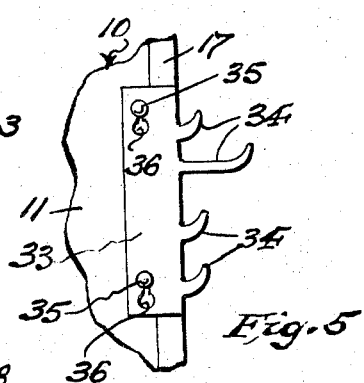
INVENTOR.
Carmen Vitale,
Attorneys

3,421,433
PORTABLE COOKING GRILL
Carmen Vitale, Newark, N.J.
(227 Berkeley Ave., Bloomfield, N.J. 07003)
Filed Aug. 19, 1966, Ser. No. 573,665
U.S. Cl. 99—340                                  4 Claims
Int. Cl. A47j 37/06

ABSTRACT OF THE DISCLOSURE

A cooking grill has a hollow, unenclosed fire-box having two opposite open sides, a standard to pivotally support the fire-box body in horizontal or vertical position, hanger rods connected to the fire-box to support a wire broiler grid and contents adjacent the fire-box when in vertical position, a plurality of fuel-supporting partition members extending transversely across the fire-box at different vertical levels, a screen member slidably mounted to close at least one open side of the fire-box and adapted to be removed to facilitate removal of ash and unconsumed fuel from the fire-box after use, and means to support skewers in offset relation to the fire-box which are removably mounted on the fire-box.

---

This invention relates to improvements in charcoal or the like burning cooking grills which are especially adapted for outdoor use, but which, with or without contained fuel, can well be used in opposition to a heat generating fire-place for cooking operations.

Cooking grills, utilizing burning charcoal or equivalent substances as fuel, are now well known to the prior art, and in forms adapted for optional disposition of their fire-boxes in either horizontal or vertical positions. When used in horizontal disposition, such devices provide a burning fuel heat emission, the heat of which directly rises therefrom for application to cooking material deposited thereon, but when used in a vertical position do not radiate heat of the burning fuel in uniform application to material to be cooked, which is suspended adjacent to a vertical face of the fire-box, so that uneven cooking effect results. This failure to attain uniform heat radiation, when the fire-box is disposed in vertical position, is due to the fact that even though the vertical interior space of the fire-box is initially filled with fuel, as the fuel burns the charcoal pieces or the like tend to crumble and drop to the lower end or bottom of said interior space, and consequently the upper or top end of said space is quickly emptied of burning fuel, so that heat radiation from the upper portion of the fire-box is substantially diminished.

In other respects, prior art devices failed to provide means for supporting skewers carrying shish-kabob roasting food substances in opposition to a vertical face of the heat disseminating fire-box, when the latter is disposed in upstanding or vertical position.

It is therefore a primary object of the present invention to provide a cooking grill, of the type above referred to, having a novel construction of fire-box so arranged as to dispose and hold contained burning charcoal or the like substantially evenly distributed thoughout the length and width thereof, especially when, in use, disposed in a vertical or upright position; and, to this end, being provided, within its interior, with a plurality of transverse partitions extending from side to side thereof, parallel to its then top and bottom ends.

Another object of this invention is to provide the fire-box with skewer supporting brackets and means to detachably mount the same on the sides of the fire-box when the latter, in use, is vertically disposed or upstanding; whereby to hold skewer supported material to be cooked in opposition to a heat radiating face of said fire-box.

Another object of this invention is to provide the fire-box with skewer supporting brackets and means to detachably mount the same on the opposite sides of the fire-box when the latter, in use, is vertically disposed, whereby to hold skewer carried material to be cooked in opposition to a heat radiating face of the fire-box.

A further object of this invention is to provide the fire-box with a grease collecting drip-pan and means to detachably mount the same in connection with said fire-box, when the latter is disposed in upstanding vertical position, and so as to project therefrom beneath material to be cooked, when said material is supported in opposition to a heat radiating face of said fire-box.

The above and other objects will be understood from a reading of the following description of an illustrative embodiment of a cooking grill according to this invention, as shown in the accompanying drawings thereof, in which drawings:

FIG. 1 is an end elevational view of the cooking grill, with its fire-box disposed in upstanding vertical position, but showing, by broken lines, a horizontal position of said fire-box.

FIG. 2 is a front elevational view of the cooking grill, with its fire-box so disposed.

FIG. 3 is an enlarged vertical sectional view, taken on line 3—3 in FIG. 2.

FIGS. 4 and 5 are respectively a front edge view and a side face view of a skewer supporting bracket as detachably mounted on a side of the upstanding fire-box.

FIG. 6 is a fragmentary vertical sectional view, similar to that of FIG. 3, but showing a metal screen of perforate back wall instead of a solid wall in the fire-box structure.

Similar characters of reference are employed in the above described views, to indicate corresponding parts.

Referring to the drawings, the cooking grill according to this invention comprises a hollow rectangular fire-box body 10 which is formed by side walls 11, a bottom wall 12, a top wall 13 and a back wall 14.

The fire-box body 10, so formed, is open at the front. In use, the open front is closed by a removable screen member 15, which is preferably formed from heavy wire mesh, but which could be formed from expanded or otherwise perforated sheet metal. When formed from wire mesh, the edges of the screen member 15 are preferably enclosed in a marginal metallic binding 16, thus stiffening and reenforcing the same against bending or other distortion. Provided in connection with the front margins of the side and bottom walls of the fire-box body 10, contiguous to the open front of the latter, is channeled guide means 17 to slidably receive the marginal binding 16 of said screen member 15, when inserting and removing the screen member to and from its closed position across the open front of the fire-box body. Affixed to the top end of the screen member 15 is a handle loop 18, by which the same can be manipulated in engaging and disengaging it from said fire-box body.

The fire-box body 10, when closed by the front screen member 15, is so dimensioned as to provide adequate interior holding space for charcoal or like fuel deposited therein for combustion between the front and back walls of the fire-box.

To support the fire-box body 10 for use, subject to optional disposition in either horizontal or vertical position, a supporting means is provided comprising spaced apart standards 19 having divergent legs 20; said standards being preferably joined by a tie-bar 21, whereby to assure stability.

The fire-box 10 is pivotally attached to the standards 19, to extend therebetween. To this end, the side walls 11 of the fire-box body are provided with screw-threaded pivot studs 22, which are suitably located to project exteriorly from the fire-box sides through the standards 19, so that the latter serve as bearing supports for the fire-box. Threaded onto the free ends of the pivot studs 22 are wing nuts 23 or the like, which, when screwed home against the standards 19, frictionally bind the fire-box body 10 to the latter, in either a horizontal or vertical position to which it is optionally disposed.

Pivotally suspended from at least one side of the fire-box body 10, adjacent an end thereof, and preferably from both sides thereof, is a stay-rod 24, the free end portion of which terminates in an angular hook portion 25. When the fire-box body is disposed in horizontal position, this stay-rod can be coupled by its hook portion to a standard 19, the latter having an opening to receive said hook portion (see broken line showing of the fire-box body 10 in FIG. 1). It will be obvious that the stay-rod 24 will hold the fire-box body against displacement from a horizontal position, thus stabilizing the same against movement under weight of material deposited thereon, during a cooking operation.

The fire-box body 10 is provided with means to suspend a wire broiler grid (not shown) in opposition to screen member 15 mounted across the front open side of said fire-box body, when the latter is disposed in its vertical or upstanding position. The broiler grid suspension means comprises a pair of spaced apart hanger rods 26, the inner ends of which are pivotally connected to the top wall 13 of the fire-box body 10, whereby the same can be swung out across the front of the latter, in outward projection therefrom but, when not in use, can be swung inwardly to overlie said top wall 13.

When steaks, chops or other flat material is to be cooked, the same may be enclosed within the fold of the wire broiler grid, and the grid then engaged over the outwardly projecting hanger rods 26, so as to be disposed adjacent and parallel to the upright front screen member 15 of the vertically positioned fire-box body 10. Also mounted on the top wall 13 of the fire-box body are spring clips 27, so positioned as to engage the out swung hanger rods 26, whereby to hold the latter in operative positions against accidental displacement therefrom.

The advantage of so cooking such material is that the latter is exposed to radiant and not direct heat of fuel burning within the fire-box body, and since the material is not above the fire, so that any grease, dripping from the cooking material can not drop into the burning fuel, there is little emanation of smoke or flame during the cooking operation, and therefore no undue charring or burning of the material, detrimental to the flavor and taste of the thus cooked material occurs. Furthermore, when so cooking material, grease drippings will fall from the cooking material by gravity, and consequently means to catch and hold such dripping can be provided. In this connection, the present invention includes means to provide a grease dripping trough or basin 28, together with means to detachably mount the same for outward projection from and extension across the lower end of the upright fire-box body, subject to removal when the latter is desired to be used in a horizontal position for other cooking operations, or when use of the cooking grill is not required. To detachably connect the trough or basin 28 to the fire-box body 10, the former is provided with a rearwardly projecting lip or flange 29, and from this lip or flange are a pair of spaced apart coupling arms 30, which can be slid inwardly through, and so as to be supported by, attachment loops 31 which are affixed to the underside of the bottom wall 12 of the fire-box body 10. These coupling arms 30 may be pivotally connected to the lip or flange 29, so that the same can be folded back over the latter, when the trough or basin 28 is detached from the fire-box body 10, for storage when not in use.

Heretofore, however, there has been a disadvantage in the use of the vertically disposed fire-box body for the above described cooking operation. This is due to the fact that the burning fuel within the fire-box tends to drop to and settle in the bottom end portion thereof, leaving the upper portion of its interior empty. As a result of this, radiation of heat to the cooking material is undesirably uneven. It being an object of this invention to overcome such disadvantage, to attain this object, the interior of the fire-box body 10 is provided with a plurality of transverse partitions or shelves 32, which extend parallel to the ends of the upright fire-box body in suitably spaced apart relation. Said partitions or shelves support bodies of burning fuel against drop, and consequently the burning fuel is held in substantially uniform distribution throughout the interior of the fire-box body from end to end thereof, whereby a substantially even radiation of heat to the cooking material is assured. The partitions or shelves 32 are preferably made of heavy wire mesh material as shown.

The fire-box body 10 is provided with detachable means to support skewers adapted to hold shish-kabob or other material desired to be roasted. Means for this purpose comprises a pair of bracket plates 33 adapted to be respectively mounted on the sides of the erected fire-box body 10, when use thereof is desired, but subject to removal therefrom when not required to be used. Said bracket plates 33 are provided with one or more skewer supporting arms 34 which project from forward edges thereof, so that, when said bracket plates are attached to the fire-box body, the same extend outwardly beyond the screen member face thereof, whereby to support material carrying skewers in offset relation to and across the screen member 15. The means for detachably mounting said bracket plates 33 on the fire-box body comprises vertically spaced apart headed attachment studs 35 which are affixed to the side walls 11 of the fire-box body, to project exteriorly therefrom. The bracket plates 33 are provided with correspondingly spaced apart keyhole slots 36, adapted to engage over said headed studs 35 (see FIGS. 4 and 5).

The fire-box body 10 may be modified, if desired, to provide the same with a rear open face instead of the closed back wall 14. In such case the rear open face may be closed by a back screen member 37 comprising a heavy wire mesh or other perforate panel, adapted to be suitably affixed to the fire-box body (see FIG. 6).

It will be understood that changes in the above described constructions and the details thereof may be made within the scope of the herefollowing claims.

I claim:

1. A cooking grill comprising a hollow fire-box having at least one unenclosed side open to the atmosphere, standard means to pivotally support the fire-box subject to optional disposition in either horizontal or upstanding vertical position, hanger rods pivotally connected to an end of the fire-box body and movable to an outswung position to overlie said open sides when the fire-box is disposed in upstanding position in order to permit suspension of food to be cooked in opposition to said open sides of the upstanding fire-box body, and a plurality of fuel-supporting partition members mounted within the fire-box body extending transversely across its interior in spaced apart relation between and parallel to its ends, a screen member slideably received in said slideway means to close said open side, said screen member being removable from said slideway means to facilitate removal of ash or unconsumed fuel from said fire-box after use, and means to support skewers in offset relation to and across at least one open side of the upstanding fire-box body, said supporting means comprising bracket plates, each having a plurality of outwardly projecting skewer holding arms, and means spaced along the length of said bracket plates to removably mount said bracket plates on respective side walls of the upstanding fire-box body.

2. A cooking grill according to claim 1, wherein the mounting means for the bracket plates comprises vertically spaced apart headed studs affixed to respective side walls of the upstanding fire-box body to project exteriorly therefrom, and said bracket plates having key-hole slots adapted to engage over the headed studs.

3. A cooking grill according to claim 2, further including a grease catch trough, and means to removably attach the same to the bottom end of the upstanding fire-box body for outward projection from and across the open side thereof.

4. A cooking grill according to claim 1, wherein said hollow fire-box has an enclosed side opposite said unenclosed side.

References Cited

UNITED STATES PATENTS

| | | | |
|---|---|---|---|
| 1,554,645 | 9/1925 | Morris | 99—421 |
| 2,441,190 | 5/1948 | Fuller. | |
| 2,565,000 | 8/1951 | Schultz. | |
| 2,619,951 | 12/1952 | Kahn. | |
| 2,709,996 | 6/1955 | Tescula | 126—25 |
| 3,045,581 | 7/1962 | Bernstein | 99—340 |
| 3,085,500 | 4/1963 | Russell | 99—339 XR |
| 3,096,706 | 7/1963 | Cardwell | 99—340 |
| 3,106,150 | 10/1963 | Gaeke | 99—446 |
| 3,121,424 | 2/1964 | Russell | 99—339 XR |
| 3,296,955 | 1/1967 | Schaniel | 99—390 XR |

FOREIGN PATENTS 359,523   2/1962   Switzerland.

WALTER A. SCHEEL, *Primary Examiner.*

J. M. NEARY, *Assistant Examiner.*

U.S. Cl. X.R.

99—421, 400, 401, 393; 126—25

UNITED STATES PATENT OFFICE
CERTIFICATE OF CORRECTION

Patent No. 3,421,433                                          January 14, 1969

Carmen Vitale

It is certified that error appears in the above identified patent and that said Letters Patent are hereby corrected as shown below:

Column 2, line 31, "of", second occurrence, should read -- or --. Column 4, line 61, after "end," insert -- channeled slideway means bordering at least one of said open sides, --.

Signed and sealed this 17th day of March 1970.

(SEAL)
Attest:

Edward M. Fletcher, Jr.                              WILLIAM E. SCHUYLER, JR.
Attesting Officer                                                 Commissioner of Patents